Nov. 4, 1969　　　J. T. RYAN　　　3,476,207

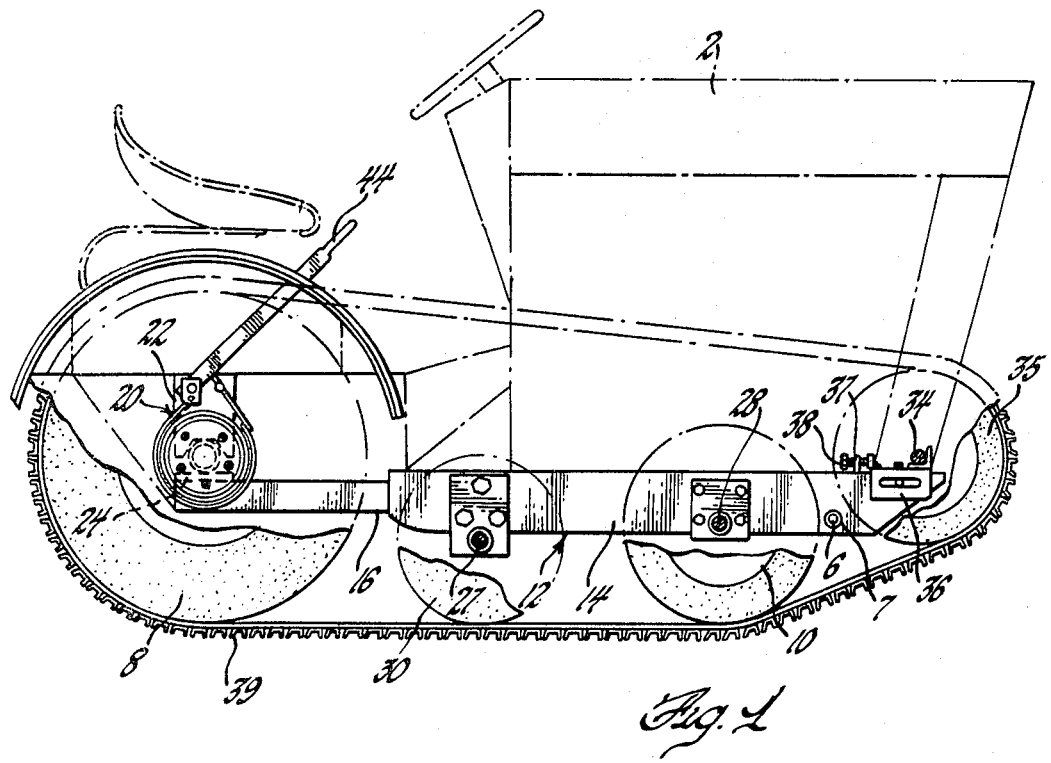

TRACTOR CONVERSION UNIT

Filed May 29, 1967　　　　　　　3 Sheets-Sheet 2

INVENTOR
John T. Ryan

Martin J. Spellman, Jr.
ATTORNEY

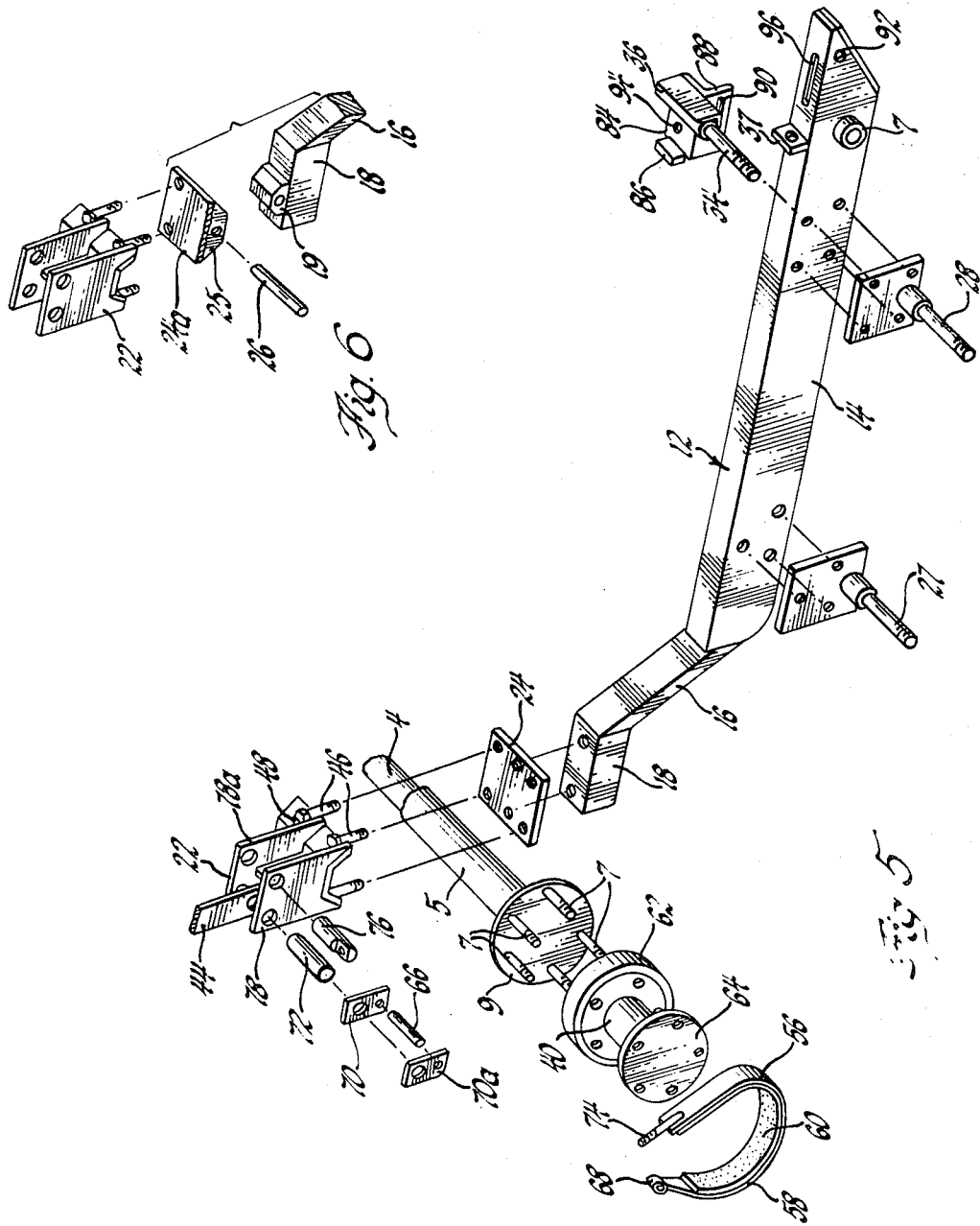

United States Patent Office 3,476,207
Patented Nov. 4, 1969

3,476,207
TRACTOR CONVERSION UNIT
John T. Ryan, Saranac, N.Y. 12981
Filed May 29, 1967, Ser. No. 642,111
Int. Cl. B62d 11/08, 55/04
U.S. Cl. 180—6.7      6 Claims

ABSTRACT OF THE DISCLOSURE

Apparatus for converting a wheeled vehicle to tracked operation. Each side of the vehicle is provided with a frame structure carrying stub axles, one of which is adjustable. The frame is secured at its forward end to the vehicle's front axle, and at the rear, preferably by a hinge, to a shackle assembly which is mounted on the rear axle housing. After conversion, the rear wheel is carried on a hub extension and is independently braked by a brake operated by a lever mounted on the shackle assembly. A continuous track passes around the outer peripheries of the rear wheel and the wheel carried by the forward stub axle.

---

This invention relates to a conversion unit for transforming a vehicle normally propelled on wheels to one that is propelled on a pair of continuous tracks.

In a more particular aspect, this invention is concerned with a convenient means of converting a wheeled tractor such as used on farms to fully tracked operation in a short time, with few tools, using a minimum of material.

This invention is especially advantageous in the situation of the small farmer or estate owner where one often owns only one tractor which, because of economical and practical compromises, is generally a wheeled type of tractor. Such tractors, while fully suited for most day-to-day operations on a farm or estate, are often entirely useless for operation in even moderate accumulations of snow, on muddy, sandy or relatively uneven terrain.

The present invention provides a means for extending the usefulness of such tractors by their conversion to fully tracked operation, simply, and with a minimum of equipment.

The advantages and features of the invention will appear more fully in the following rescription, read in conjunction with the accompanying drawings, which, by way of example, illustrates a specific embodiment of the invention.

In the drawings.

FIGURE 1 is a fragmentary side elevational view, partly in section, showing the overall arrangement of the conversion unit in relation to a tractor;

FIGURE 2 is a plan view of the conversion unit attached to a tractor, body portions of which are indicated;

FIGURE 5 is an exploded perspective view of the frame, stub axles, shackle assembly, axle extension, and brake assembly of the conversion unit.

FIGURE 6 is an exploded perspective view illustrating an alternative means of attaching the side frame to the shackle assembly.

Figure 3:
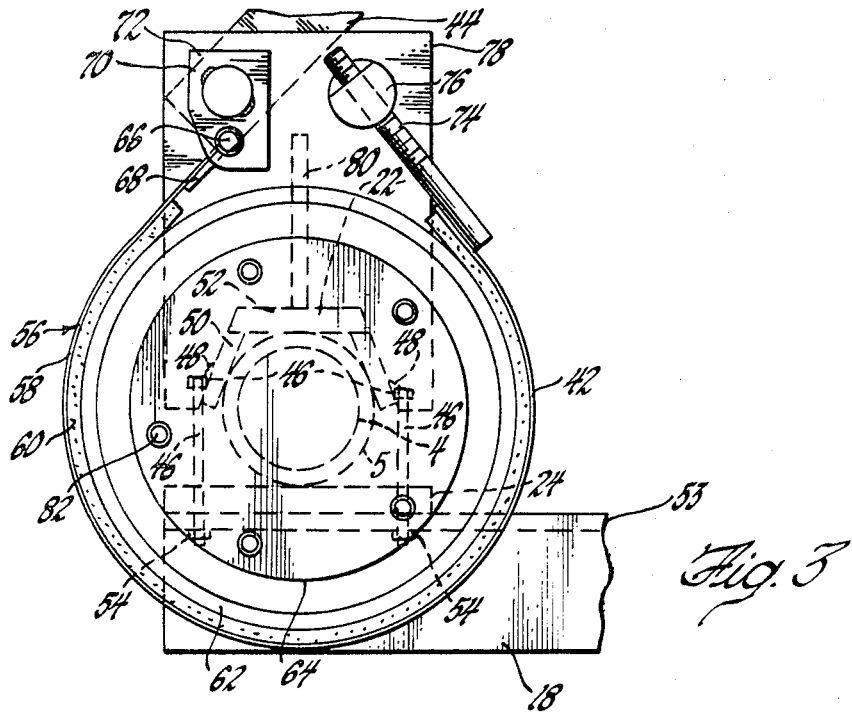
FIGURE 3 is an enlarged side elevational view of the brake assembly, axle extension, shackle assembly, and rear segment of the frame of the conversion unit.

In FIGURES 1 and 2 a wheeled vehicle which may be converter to a fully tracked vehicle by means of the conversion unit of this invention is shown for purposes of illustration of a preferred embodiment of the invention as a tractor 2. The tractor 2 is ordinarily propelled by means of a pair of rear drive wheels 8 which receive power from a conventional power source, not illustrated, through a power transmission train including rear axle 4 with an axle housing 5.

When operating as a wheeled vehicle the tractor 2 is steered by means of a pair of front wheels carried on front axle 6. The present detailed description is directed to an assembly for the right-hand side of the vehicle, it being apparent that a corresponding assembly is provider for the left side. In the illustration shown in the drawings the wheel has been removed from the axle 6 and is being utilized as a bogie 10.

A frame 12 comprising a forward main section 14, an intermediate section 16, and a shank section 18, is connected to the tractor 2 by means of a transverse sleeve 7 at the forward part of the frame section 14, which sleeve 7 fits over the axle 6, and by a shackle assembly 20 which fastens to the rear axle housing 5. The shackle assembly 20 is comprised of an upper assembly 22 and a lower member 24, shown in the form of a plate which is fastened to the shank section 18 by bolts and nuts not shown.

The main section 14 of the frame 12 is provided with a plurality of stub axles which are indicated at 27, 28, and 34, which carry wheels 30, 32, and 35 respectively.

The forward stub axle 34 is mounted on an adjusting means 36. In the embodiment shown, a bolt 38 is threaded through a flange 37 on the top of frame section 14. Tightening of the bolt 38 moves the axle 34 forward causing the wheel 35 in conjunction with large wheel 8 to place the track 39 under tension and to thus hold it in position on the tires.

While not shown as such, it should be understood that the track 39 should preferably have a silghtly concave cross section in order to prevent it from shifting laterally on the tires.

Also, the stub axles while shown as being rigidly mounted on the frame 12 may, if desired, be spring mounted or the like.

A rear axle extension 40 is fitted to the hub (not shown) of the rear axle 4, and is made of such length that the center line of the wheel 8 is in line with those of the wheels carried by the frame 14.

In conjunction with the pair of axle extensions 40, there are provided independent brakes 42 for each of the rear drive wheels 8. In this manner the drive wheels 8 may then be controlled independently of the permanent braking system of the vehicle. Thus, the vehicle which has been converted to tracked-operation may be steered by braking one of the wheels without the other, or by differential braking. In the embodiment shown each brake is controlled by a lever 44.

It is apparent, of course, that the axle extension 40 and brake 42 may not be required in those few instances of some larger tractors which have both laterally adjustable rear wheels and independent brakes for each side.

Figure 4:
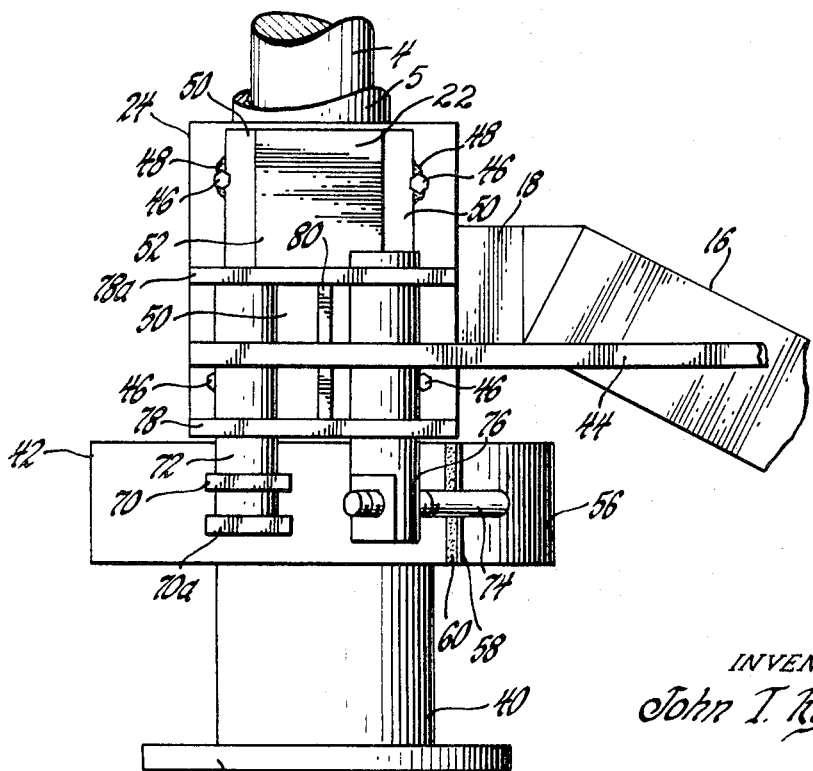
FIGURE 4 is an enlarged view of the same assemblies as in FIGURE 3.

FIGURES 3 and 4 show the shank section 18 of the frame 14, axle extension 40, brake 42, and shackle assembly 20 in enlargement.

The shackle assembly 20 secures both the brake 42 and the side frame 12 to the rear axle housing 5 of the vehicle 2.

The upper assembly 22 of the shackle assembly 20 is comprised of an inverted U structure formed by the sides 50 which depend from the horizontal plate 52. The bolts 46 are welded at 48 at their upper ends to the sides 50.

This inverted U structure rests on top of the axle housing 5 adjacent to the inner side of the hub thereof and is secured to it by bolts 46 through plate 24 and nuts which are not shown.

The plate 24 may be secured to the shank portion 18 of the frame 12 in any suitable manner such as by welding, bolting as shown in FIGURES 3 and 4, or by the preferred hinged arrangement of FIGURE 6.

As shown in FIGURE 3 the shank portion 18 may be made of an angle iron having a horizontal flat segment 53 which may be welded, or bolted to the plate 24 as indicated schematically in FIGURE 5 by bolts and nuts 54.

The brake assembly 42 serves as a means of controlling the direction of the converted vehicle by allowing the operator to apply differential braking through brake levers 44 to the wheels 8, which in the tracked configuration supply motive power to the track. In addition to this function, the brakes 42 also naturally serve as a secondary braking system per se in addition to the normal system provided with the vehicle.

A brake band 56 is comprised of an outer metal band 58 which serves as a support or backing for the lining 60 which is located peripherally of a brake drum 62.

The drum 62 fastens by conventional lugs 7 as indicated in FIGURE 5 or other suitable attaching means to the hub 9 of the rear axle of the vehicle after the wheel 8 has been removed therefrom.

The axle extension 40 extends outwardly from the brake drum 62 and carries the extension hub 64 at the outer end thereof to which the wheel 8 is mounted in the tracked configuration.

The brake band 56 is movably secured at one end thereof by means of a closed loop 68 formed in the one end of the backing 58. A pin 66 which passes through the loop 68 with clearance enough to permit rotational motion of the loop 68 relative to the pin 66. The pin 66 in turn is supported by the pair of brackets 70 and 70a which are mounted as shown in spaced relationship on the larger pin 72 which is rotatably supported by upright members 78 and 78a. Rigidly attached to the pin at a point between the members 78 and 78a is the brake lever 44.

The brake band 56 is secured at its other end by means of the pin 74 which is welded or otherwise joined to the backing 58 at one end, the other end being threaded. The threaded end of pin 74 secured in a transverse threaded bore in larger pin 76.

Rearward movement of the lever 44 thus tightens the band 56 against the drum 62.

The pin 76 also is supported by means of upright members 78 and 78a respectively. Members 78 and 78a are attached at their bases to the sides 50 and the horizontal plate 52 generally by welding.

A support member 80 is welded to the opposing faces of uprights 78 and 78a as well as the top surface of the horizontal plate 50 to increase the strength of the assembly.

In FIGURE 5 the overall assembly of frame 12, shackle 20, hub extension 40 and brake assembly 56 as described in detail above is shown in exploded view.

The adjusting means 36 in the embodiment illustrated is comprised of a right angle bracket 84 which fits on the top and outside surfaces of the forward end of the frame section 14. The stub axle 34 is welded to the top of the bracket 84. A bearing flange 86 at the rear of the bracket 84 is aligned forward of the flange 37 on the frame section 14. The bolt 38 which is threaded through flange 37, and when turned clockwise moves the axle 34 forward to tension the track 39. Once the proper adjustment is made the bracket 84 is secured in place on the frame section 14 by a bolt passing through slot 90 in depending portion 88 of bracket 84 and hole 92 in the side of member 14; and a bolt passing through hole 94 in the horizontal portion of bracket 84 and slot 96 in the top of member 14.

In FIGURE 6 there is shown an alternative means for attaching the frame 12 to shackle assembly 20. The upper assembly 22 of the shackle assembly 20 is the same as in the previous embodiment. In this instance, lower plate 24a is provided with a pair of depending flanges 25 (one only is seen) having a bore therein to receive pin 26 which passes through a transverse bore in the projection 19 on the top of section 18 adjacent to the rear end thereof. In this arrangement the side frame 12 can pivot on the pin 26.

The main front axle 6 of the vehicle 2, in practically all instances, will normally be connected to the vehicle 2 in a conventional manner permitting at least limited up and down movement. With the frame 12 able to swing somewhat on pin 26 a rather flexible suspension is effected which gives more stability to the converted tracked vehicle and decreases any twisting torque strain on the shackle assembly 20 and consequently the housing 5 of the rear axle 4, which might otherwise be caused by flexion of the frame 12 due to up and down motion of the front axle 6.

The conversion of a normally wheeled vehicle 2 such as a tractor is readily accomplished in less than a half hour by one or two workers. For instance, one side of the vehicle is jacked up and the front and rear wheels are removed from axles 6 and 4 respectively. The frame 12 is attached to front axle 6 by slipping sleeve 7 over the stub of the axle 6.

In the case of larger vehicles having a large front wheel hub, it is apparent the axle 6 could be attached to the frame 12 by fastening the hub to the frame by lugs passing through corresponding apertures formed in the frame section 14. In such instance the C-shaped cross section of the frame section 14 is made large enough to cradle such hub within its confines.

With larger vehicles it also may be desirable to construct the adjusting means 36 in the form of a frame extension carrying the axle 34 and also having a C-shaped cross section of such dimensions so as to form a close telescoping fit with the frame section 14. The extension and section 14 are provided with means for adjustably bolting them together in a conventional manner.

The extension axle 40 is then attached to the axle 4 as well as the shackle assembly 20 to the axle housing 5. The brake assembly 42 is then connected to the shackle assembly 20 and the band adjusted around the drum 62. The frame 12 at section 18 is then bolted to the lower plate 24 of the shackle assembly 20, or in the case of the alternate means of FIGURE 6, the pin 26 is inserted to complete the hinged assembly.

Then the rear drive wheel 8 is placed on the extension hub 62, wheels 30 and 35 placed on axles 27 and 34 respectively if this has not been done prior to mounting the frame 12, and the front wheel 10 from the vehicle 2 is mounted on stub axle 28.

The track 39 is then put in place as shown over wheels 8 and 35. As mentioned, the track 39 preferably must have a slight concave cross section so as to be stable on the tires and not slip to either side. The track 39 is then tensioned to the proper degree by lightening bolt 38 against the bearing flange 86 of the adjusting means 36. After the adjustment is made, the bolts through bracket 84 and frame section 14 are tightened to fix the bracket 84 firmly in position on the frame section 14, thus pressing the wheel 35 tightly against the track 39.

The corresponding procedure is then repeated on the other side of the vehicle.

The jacks are then removed and the now tracked vehicle is ready for operation.

The converted vehicle is steered by selective braking of either rear wheel or differential braking by rearward movement of brake levers 44. It is possible if desired, of course, that for added convenience, although considerably more expensive, steering linkages for front axle 6 could be disconnected and the operation of the brakes 42 effected through a connection to the normal vehicle steering mechanism. This is not a preferred method, however, since it adds considerably to the cost and complexity of the conversion unit which is designed primarily as a simple, convenient, and economical means of converting wheeled tractors to tracked operation in a minimum of time and relatively simply.

What is claimed:

1. In a wheeled vehicle having on each side thereof a front axle, a rear drive axle having a hub at the outer end thereof normally adapted to mount a relatively large wheel, and an axle housing for said rear drive axle; a conversion unit comprising a frame, means for securing said frame to the outer end of said front axle, a stub axle adjustably mounted on the outer side of said frame forward of the point at which said frame is secured to said outer end of said front axle, at least one second stub axle secured to the outer side of said frame at a point rearward of the point at which said frame is secured to the outer end of said front axle, a shackle assembly adapted to be secured to said rear drive axle housing inwardly of the hub of said rear axle and comprising an upper shackle assembly and a lower shackle assembly, an axle extension adapted to be mounted on said hub of said drive axle and having a brake drum at the inner end thereof and means at the outer end thereof adapted for mounting said large wheel, a brake assembly mounted on said upper shackle member and positioned operatively in relation to said brake drum to be capable of effectuating a braking action, and means securing the rearward end of said frame to said lower shackle member.

2. A conversion unit as claimed in claim 1 wherein each of said stub axles and said axle extension have wheels mounted thereon, and wherein an endless track having a concave cross section extends around the outer peripheries of said wheels.

3. A conversion unit as claimed in claim 2 wherein the means securing the rearward end of said frame to said lower shackle member is a hinge.

4. A conversion unit as claimed in claim 1 wherein the means securing the rearward end of said frame to said lower shackle member is a hinge.

5. For use in combination with a wheeled vehicle having on each side thereof, a front axle, a rear drive axle and an axle housing for said drive axle, said drive axle having a hub out the outer end thereof normally adapted to mount a relatively large wheel; a conversion unit comprising a rigid frame, means securing said frame to the outer end of said front axle, a first stub axle adjustably mounted on the outer side of said frame forward of and above the point at which said frame is secured to said outer end of said front axle, at least one second stub axle secured to the outer side of said frame at a point rearward of the point at which said frame is secured to the outer end of said front axle, a shackle assembly secured to said axle housing inwardly of the hub of said rear axle and comprising an upper shackle member and a lower shackle member, means securing the rearward end of said frame to said lower shackle member, wheels mounted on each of said axles, the lowest periphery of the wheel on said first stub axle being above the plane of the lowermost periphery of the rear drive wheel and the wheel on said second stub axle, and an endless track entrained about the outer peripheries of said wheels.

6. A conversion unit as claimed in claim 5 wherein the means securing the rearward end of said frame to said lower shackle member is a hinge.

References Cited

UNITED STATES PATENTS

| 1,461,028 | 7/1923 | Davis | 180—6.7 |
| 2,852,317 | 9/1958 | Riemerschmid | 180—6.7 |
| 2,891,821 | 6/1959 | Mayr. | |
| 3,190,384 | 6/1965 | Dufresne | 180—6.7 |

FOREIGN PATENTS

| 758,938 | 10/1956 | Great Britain. |
| 897,877 | 5/1962 | Great Britain. |

RICHARD J. JOHNSON, Primary Examiner

U.S. Cl. X.R.

180—9.5